Patented May 14, 1946

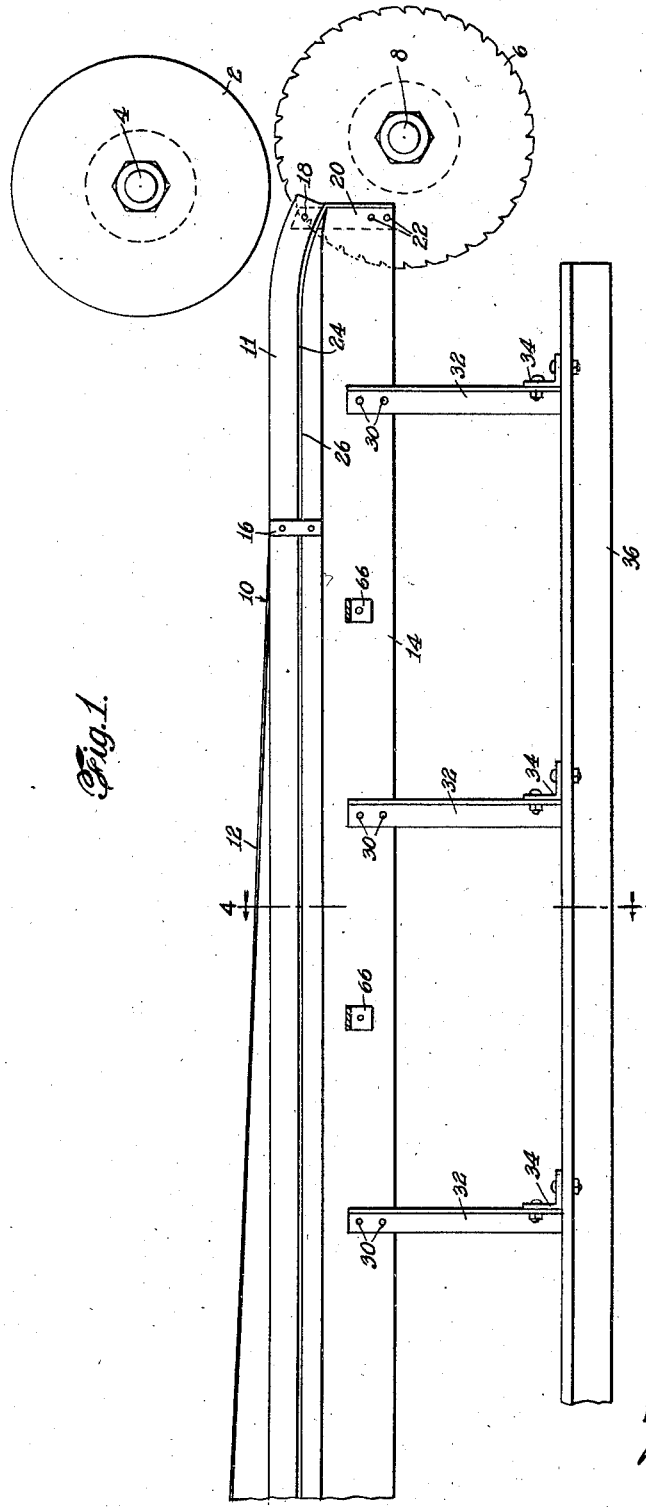

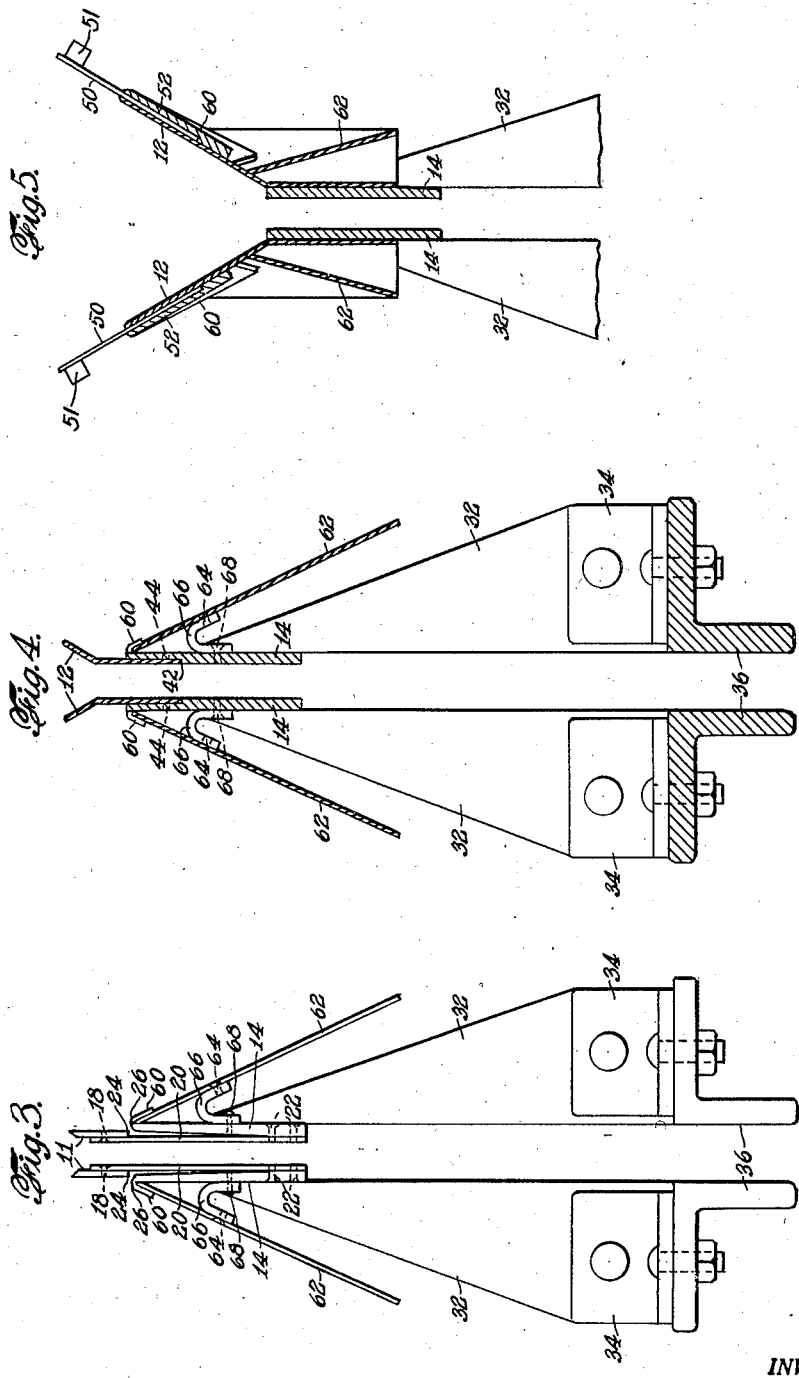

2,400,118

UNITED STATES PATENT OFFICE 2,400,118

FISH FILLETING MACHINE

William H. Hunt, National City, Calif., assignor to The Atlantic Coast Fisheries Company, New York, N. Y.

Application May 10, 1944, Serial No. 534,847

7 Claims. (Cl. 17—2)

This invention relates to fish filleting machines, and more particularly to ribbing knives to scrape the fillets from the ribs.

United States Patent 2,149,021 discloses a fish filleting machine wherein a fish, tail leading and back downward, is first cut inwardly along its back throughout its length and almost to the backbone, and thereafter passed to the zone of action of a pair of circular belly-slitting knives which slit the belly side of the fish. During the latter operation, the fish is supported upon a pair of rotating guide discs. The guide discs and the circular belly-slitting knives are rotated at high peripheral speeds. When the fish leaves the zone of action of the belly-slitting knives, each fillet remains attached to the ribs of the fish and also to the backbone of the fish between the cuts from the back and belly sides. Due to the rotation of the belly-slitting knives and the supporting guide discs, the fish is projected onto a pair of spaced rigid ribbing knives which sever the fillets from the backbone and the ribs. A ribbing conveyer serves to maintain the fish in contact with the ribbing knives and feed the fish thereover.

In the apparatus above described, when a fish of a size smaller than that for which the ribbing knives are designed is projected onto such rigid ribbing knives, the latter will break or indeed sever the ribs.

An object of this invention is to provide new and improved fish ribbing knives.

Another object of this invention is to provide fish ribbing knives which will satisfactorily function with fish of various sizes.

A further object of this invention is to provide fish ribbing knives having oppositely disposed forward sections which are yieldingly mounted whereby the ribbing knives will satisfactorily function with fish of different sizes.

A specific object of this invention is to provide fish ribbing knives having oppositely disposed forward sections and to so mount said forward sections that at least the front extremities thereof will move laterally, within limits, whereby fish of various sizes can be treated.

Other and additional objects will appear hereafter.

The above objects are accomplished, in general, by making each ribbing knife in two sections, the forward section (i. e. the section which first receives the fish as it leaves the zone of action of the belly-slitting knives) being yieldingly mounted whereby, when a fish having a backbone larger than that for which the knives are originally set, such forward sections will laterally yield to accommodate such fish. The yielding sections of the ribbing knives are so positioned that their inward movement, i. e. toward each other, is controlled by the rotary disc guides. Means are also provided to limit the outward movement (away from each other) of such yielding sections.

The invention is particularly adapted for use in combination with an apparatus in which, as the decapitated fish is led, tail leading and back downward, the back thereof is slit throughout its length almost up to the backbone, and later the belly side is cut by a pair of parallel incisions. Such an illustrative apparatus, which is shown in United States Patent 2,149,021, is also provided with various means for positioning the fish, feeding the fish, straightening the fins, etc. and may be provided with a dorsal fin-removing device such as, for example, that shown in United States Patent 2,137,291, or in copending application Serial No. 525,546.

The details of the invention will now be explained in connection with the accompanying drawings wherein:

Figure 1 is a side elevation of an embodiment of the invention, with the shields, guards and rotary clipping knives omitted;

Figure 2 is a top plan view of the apparatus shown in Figure 1;

Figure 3 is a front end view of the ribbing knives including the shields and guards but with the belly knives and traction discs omitted.

Figure 4 is a section taken on the line 4—4 of Figure 1 and including the shields and guards; and Figure 5 is a section taken on the line 5—5 of Figure 2 and including the shields, guards and rotary clipping knives.

Referring now to the drawings wherein like reference numerals designate like parts, the reference numeral 2 designates a pair of spaced circular belly-slitting knives mounted on a single shaft 4 carried in a suitable bearing mounted on the frame of the machine (not shown). Below the belly knives 2 there is a pair of spaced circular guide discs 6 mounted on a single shaft 8 carried in a suitable bearing mounted on the frame of the machine (not shown). As shown in Figure 1, the shafts 4 and 8 are out of vertical alignment. The guide discs 6 are designed to enter the slit in the back of the fish and engage the backbone to support the fish during the belly-slitting operation. The belly-slitting knives 2 and the guide discs 6 are driven by suitable means (not shown) at high peripheral speeds.

When the fish leaves the zone of action of the belly knives 2, the fillets are still partly attached to the backbone by a ribbon of flesh between the opposed extremities of the back and belly cuts and also to the ribs.

The aforementioned belly knives and circular supporting discs are of the general type shown in United States Patent 2,149,021 and, since the specific details of construction thereof form no part of this invention, further description thereof is deemed unnecessary.

The fish is fed through the sphere of action of the belly knives 2 at a high rate of speed and is projected onto a pair of spaced, oppositely disposed ribbing knives, generally indicated by the reference numeral 10, which sever the flesh attached to the backbone and scrape the flesh from the ribs. A ribbing conveyer (not shown but which may be of the type shown in United States Patent 2,149,021 or in copending application Serial No. 530,967) can be used to help feed the fish across the ribbing knives and maintain it thereon.

Each of the ribbing knives 10 is formed of two parts, namely a forward section 11 and a rear section 12. Each forward section 11 is secured at the rear end thereof to a support 14 by means of a strap 16 which is riveted to the section 11 and the support 14. At its forward end, each knife section 11 overlaps onto a guide disc 6 and is secured by means of flat screws 18 to a flat spring 20 disposed adjacent the inner surface of the knife section 11. Each spring 20 is secured at its lower end to the inner surface of the support 14 by flat screws 22.

In the form shown in Figures 1 and 3, it will be noted that the bottom edge 24 of each forward knife section 11 is spaced from the top edge 26 of the respective support 14 to provide clearance therebetween. Preferably, sufficient clearance between each spring 20 and the support 14 to which it is secured is also provided, for reasons which will become apparent hereafter.

From the foregoing details of construction and the manner in which each forward section 11 is mounted, it is apparent that each forward section 11 is movable outwardly and inwardly. The extent of the outward movement of each forward section 11 is limited by the respective supports 14, and the extent of the inward movement is limited by the respective guide discs 6.

Each support 14 extends lengthwise of the machine and is secured through screws 30 to spaced supports 32. Each support 32 is secured through the angle 34 to the base 36 which extends longitudinally of the machine.

Each support 14, beyond the yielding section 11, is provided with a shoulder 42 on which the knife section 12 is positioned. A flat screw 44 secures the knife to the support 14. Each knife section 12 is stationary and at the forward end thereof is in alignment with the rear end of the knife section 11 and in abutting relationship therewith. Rearwardly of such parallel portions, each knife section 12 diverges upwardly. At the extreme extremity is a pair of clipping blades 50 which are circular in form. Each blade is carried at one end of a rotatable shaft 51 and serves to sever any remaining connection that may exist between the fillets and ribs of the fish. As shown in Figure 5, each blade 50 rotates in a slot formed by the section 12 and a guide 52 secured to the knife holder adjacent thereto.

A shield 60 extending lengthwise of the machine is secured, as by soldering, adjacent the top edge 26 of the support 14 and to the stationary knife section 12. A guard 62 is positioned beneath the shield 60 and is secured by means of flat screws 64 to brackets 66 secured to the support 14 by means of screws 68.

As is apparent from the foregoing description, the forward sections 11 of the ribbing knives 10 are constructed and so spaced as to effectively function on a fish of a certain predetermined size. When such a fish is projected from the zone of action of the belly-slitting knives, the backbone of said fish will ride on the edges of the knife sections 11 and thence on the cutting edges of the stationary knife sections 12, whereby the fillets will be scraped from the ribs. When a fish of larger size than that for which the forward sections 11 are normally spaced is projected thereon, the sections 11 will yield outwardly, the limit of the outward movement being when the springs 20 engage the supports 14. After such fish has passed from the forward sections 11, due to the action of the springs 20, the forward sections will be restored to their normal position, the guide discs 6 limiting the inward movement of such sections.

As is apparent from the foregoing, the present invention provides fish ribbing knives which are capable of satisfactory operation with fish of various sizes. By making the springs 20 adjustable, the range of sizes with which the apparatus can be used can be materially increased.

Since it is obvious that various changes and modifications may be made in the above description without departing from the nature or spirit thereof, this invention is not restricted thereto except as set forth in the appended claims.

I claim:

1. A fish ribbing apparatus comprising a pair of oppositely disposed spaced ribbing knives, each knife being formed of a rear section and a forward section in abutting relationship, means to fixedly mount each rear section, and means to yieldingly mount each forward section to permit lateral movement at least at the front end thereof.

2. A fish ribbing apparatus comprising a pair of oppositely disposed spaced ribbing knives, each knife being formed of a rear section and a forward section in abutting relationship, means to fixedly mount each rear section, means to yieldingly mount each forward section to permit lateral movement at least at the front end thereof, and means to limit the outward lateral movement of each forward section.

3. A fish ribbing apparatus comprising a pair of oppositely disposed spaced ribbing knives, each knife being formed of a rear section and a forward section in abutting relationship, means to fixedly mount each rear section, means to yieldingly mount each forward section to permit lateral movement at least at the front end thereof, and means to limit the inward lateral movement of each forward section.

4. A fish ribbing apparatus comprising a pair of oppositely disposed spaced ribing knives, each knife being formed of a rear section and a forward section in abutting relationship, a pair of stationary knife holders, one of said knife holders cooperating with each knife, means securing each rear section to the respective stationary knife holder, and means mounting each forward section adjacent the rear and front ends thereof on the respective knife holder, the means at the front end permitting lateral movement of said forward sections.

5. A fish ribbing apparatus comprising a pair of oppositely disposed spaced ribbing knives, each knife being formed of a rear section and a forward section in abutting relationship, a pair of stationary knife holders, one of said knife holders cooperating with each knife, means securing each rear section to the respective stationary knife holder, a strap securing the rear end of each forward section to the respective knife holder, and a pair of springs, each spring having one end thereof secured adjacent the front of a forward section and the other end of said spring being secured to the respective knife holder.

6. A fish ribbing apparatus comprising a pair of oppositely disposed spaced ribbing knives, each knife being formed of a rear section and a forward section in abutting relationship, a pair of stationary knife holders, one of said knife holders cooperating with each knife, means securing each rear section to the respective stationary knife holder, a strap securing the rear end of each forward section to the respective knife holder, and a pair of flat springs, each spring having one end thereof secured to the inner surface of a forward section adjacent the front end thereof, the other end of said spring being secured to the inner surface of the respective knife holder, sufficient clearance being provided between the springs and knife holders to permit outward movement of the forward sections when pressure is applied thereto to effect such movement.

7. A fish filleting machine comprising, in combination with a pair of rotating belly-slitting knives and a pair of circular guide discs, a pair of oppositely disposed spaced ribbing knives, each ribbing knife being formed of a rear section and a forward section in abutting relationship, each forward section overlapping on the outer surface of the guide disc adjacent thereto, a pair of stationary knife holders, each knife holder cooperating with each ribbing knife, means securing each rear section to the respective stationary knife holder, a strap securing the rear end of each forward section to the respective knife holder, and a pair of flat springs, each spring having one end thereof secured adjacent the front end of a forward section and the other end of said spring being secured to the respective knife holder, said springs normally maintaining the overlapping portions of the forward sections in contact with the outer surfaces of the said guide discs.

WILLIAM H. HUNT.